United States Patent
Stumpe et al.

(10) Patent No.: US 11,436,741 B2
(45) Date of Patent: Sep. 6, 2022

(54) ADAPTIVE IMAGE ALIGNMENT USING LOCALLY OPTIMAL TRANSFORMATIONS

(71) Applicant: Google LLC, Mountain View, CA (US)

(72) Inventors: Martin Stumpe, Belmont, CA (US); Varun Godbole, Mountain View, CA (US)

(73) Assignee: Google LLC, Mountain View, CA (US)

( * ) Notice: Subject to any disclaimer, the term of this patent is extended or adjusted under 35 U.S.C. 154(b) by 914 days.

(21) Appl. No.: 16/315,919

(22) PCT Filed: Mar. 6, 2018

(86) PCT No.: PCT/US2018/021140
§ 371 (c)(1),
(2) Date: Jan. 7, 2019

(87) PCT Pub. No.: WO2019/172890
PCT Pub. Date: Sep. 12, 2019

(65) Prior Publication Data
US 2021/0358140 A1    Nov. 18, 2021

(51) Int. Cl.
*G06T 7/33* (2017.01)
*G06T 3/20* (2006.01)
*G06T 3/40* (2006.01)

(52) U.S. Cl.
CPC ............ *G06T 7/33* (2017.01); *G06T 3/20* (2013.01); *G06T 3/40* (2013.01);
(Continued)

(58) Field of Classification Search
CPC . G06T 2207/20072; G06T 2207/30024; G06T 7/33; G06V 10/426; G06V 20/695
See application file for complete search history.

(56) References Cited

U.S. PATENT DOCUMENTS 6,750,873 B1 *  6/2004  Bernardini ............... G06T 7/55
                                                  345/581
2005/0094898 A1   5/2005  Chenyang et al.
(Continued)

FOREIGN PATENT DOCUMENTS

EP           2634749 A2      9/2013

OTHER PUBLICATIONS

Mueller, Dan et al., "Real-Time Deformable Registration of Multi-Modal Whole Slides for Digital Pathology", Computerized Medical Imaging and Graphics, vol. 35, No. 7-8, Oct. 2011, pp. 543-556.
(Continued)

*Primary Examiner* — Ming Wu
(74) *Attorney, Agent, or Firm* — McDonnell Boehnen Hulbert & Berghoff LLP (57) ABSTRACT

A method for aligning two different magnified images of the same subject includes a first step of precomputing rigid transformations for the two different images globally (i.e., for all or approximately all regions of the images). Pairs of corresponding features in the two different magnified images are identified and transformation values are assigned to each of the pairs of corresponding features. In a second step, while images are being generated for display to a user, a locally optimal rigid transformation for the current field of view is computed. In a third step the images are aligned as per the locally optimal rigid transformation. Non-zero weight is given to transformation values for pairs of features that are outside the current field of view. Typically, the second and third steps are repeated many times as the images are generated for display and user either changes magnification or pans/navigates to a different location in the images.

15 Claims, 7 Drawing Sheets

(52) U.S. Cl.
CPC ............... *G06T 2207/10056* (2013.01); *G06T 2207/20092* (2013.01); *G06T 2207/30024* (2013.01)

(56) References Cited

U.S. PATENT DOCUMENTS

| | | | |
|---|---|---|---|
| 2008/0143680 A1* | 6/2008 | Allen | A61B 5/742 |
| | | | 345/173 |
| 2012/0014559 A1 | 1/2012 | Suehling et al. | |
| 2013/0243302 A1* | 9/2013 | Liu | G06T 3/0075 |
| | | | 382/133 |
| 2016/0239956 A1* | 8/2016 | Kang | G06T 17/005 |
| 2016/0321809 A1* | 11/2016 | Chukka | G06V 20/695 |
| 2017/0181685 A1* | 6/2017 | Lee | A61B 5/4088 |

OTHER PUBLICATIONS

PCT International Search Report and Written Opinion, PCT International Application No. PCT/US2018/021140, dated Oct. 17, 2018, 15 pages.

* cited by examiner

ADAPTIVE IMAGE ALIGNMENT USING LOCALLY OPTIMAL TRANSFORMATIONS

CROSS REFERENCE TO RELATED APPLICATIONS

The present application claims priority as a U.S. national stage entry of PCT application serial no. PCT/US2018/021140, filed Mar. 6, 2018. The full disclosure of PCT/US2018/021140 is incorporated herein by reference.

BACKGROUND

This disclosure relates to the field of digital pathology and more particularly to a method for aligning a pair of corresponding images, typically very large images, e.g. gigapixel histopathological tissue images, for viewing the images together. For example, the pair of images could be two different images of the same tissue, for example one image (image A) of a slide of a tissue section stained with hematoxylin and eosin (H&E) and another image (image B) of adjacent tissue section stained with a special stain, e.g., an immunohistochemical (IHC) stain.

In some applications, such as cancer diagnosis, accurate local alignment is important, for example to display an H&E stained image alongside an IHC stained serial section image. At the same time, in generating aligned images, it is important that the tissue images are not distorted since viewing an image with distortions present could impact a diagnosis that is obtained from viewing such images on a workstation. For instance, cells that get stretched or compressed might appear benign even though they are cancerous. Since tissue slide images often suffer from distortions, these two contradicting requirements cannot be solved simultaneously and one ends up with imperfect alignment or corrupted cellular appearance.

The primary application considered here is the alignment of gigapixel pathology images, but the technique can be applied to other images as well, in particular if those images require precise local alignment without deformations.

Existing technologies use either rigid transformations (leading to local alignment errors), warping (leading to distorted cellular and morphological features), or require manual corrections of the user. In particular for applications with very large images, some implementations use feature extraction at different scales of the image, such as both e.g. 5X objective power as well as 40X objective power for microscopy images.

Prior art reflecting work in this area includes the following literature: D. Mueller et al., *Real-time deformable registration of multi-modal whole slides for digital pathology*. Computerized Medical Imaging and Graphics vol. 35 p. 542-556 (2011); F. El-Gamal et al., *Current trends in medicalimage registration and fusion*, Egyptian Informatics Journal vol. 17 p. 99-124 (2016); J. Singla et al., *A systematic way of affine transformation using image registration*, International Journal of Information Technology and Knowledge Management July-December 2012, Vol. 5, No. 2, pp. 239-243, and Z. Hossein-Nejad et al., *An adaptive image registration method based on SIFT features and RANSAC transform*, Computers and electrical engineering Vol. 62 p. 5240537 (August 2017)

SUMMARY

This disclosure describes a method of aligning images which uses adaptive rigid transformations to perform locally optimal alignments for the field of the view currently displayed for the user, e.g., on a workstation. This solution leverages an adaptive approach for meeting two a priori conflicting requirements, and in particular the disclosure may achieve these requirements adaptively and efficiently while the user is panning across the images or changing the zoom level. An advantage of the feature of this disclosure is that it may achieve both objectives: (1) high precision local alignments, and (2) no tissue deformations. Both are critical features for cancer diagnosis (and other applications), but are usually contradictory requirements if one of the images suffers from deformations with respect to the other, as is commonly the case for pairs of tissue images.

The term "rigid" is used here to describe a transformation performed on an image which consists of a translation of the image (in any direction within the plane of the image) and/or a rotation of the image in the plane of the image.

The term "local" is used to mean "defined in relation to a field of view in at least one of the images". Thus, "locally optimized" means optimized with respect to the field of view.

The term "global" is used to refer to substantially the entirety of the images.

A "transformation value" (also referred to herein as a "coefficient" or "spring") means a set of one or more numerical values derived from a pair of corresponding features in the pair of images and representing a displacement vector effecting a rigid transformation. The transformation value may be representative of a difference of position and/or orientation of the pair of features in order to bring the corresponding features into alignment. The "transformation value" refers to such displacement vectors and not an effect, e.g., as a transformation itself.

The term "adaptively" is used to mean performed repeatedly as a function of a varying quantity, such as a varying position of a field of view in at least one of the images or change in zoom/magnification when displaying the images.

In one particular aspect, a method is provided for aligning and displaying two different magnified images of the same subject. The method consists of three steps:

1) identifying pairs of corresponding features in the two different magnified images, and assigning transformation values to each of the pairs of corresponding features, the transformation values representing respective rigid transformations; this step can be computed in advance, for example prior to the initial display of the images;

2) while the images are presented for display, computing a further rigid transformation (a "locally optimal rigid transform") for the current field of view as a rigid transformation in which the transformation values for a plurality of the pairs of corresponding features are weighted by respective weights. In the computing step 2) the weights depend upon the position of the respective pairs of corresponding features in relation to the field of view, and a non-zero weight is given to transformation values for one or more pairs of features that are outside the current field of view, and 3) aligning the images in accordance with the further rigid transformation.

Typically, step 2) and step 3) is repeated many times as the images are viewed by the user and the user either changes magnification or pans/navigates to a different location in the images. Each time the navigation or zooming stops and a new field of view is chosen by the user, a new locally optimal rigid transformation for the current field of view is computed taking into account the transformation values outside of the current field of view.

In one embodiment, in step 2) transformation values within the current field of view receive a maximum weight (e.g., a value of "1"), whereas adjacent areas outside the current field of view receive a lesser or medium, non-zero weighting; and still further areas outside the current field of view will receive a still lesser but non-zero weighting. For example, in a first region immediately surrounding the current field of view the transformation values are weighted by ½ and a second region peripheral to the first region the transformation values are weighted by ¼. Various possible weighting regimes are contemplated and described in FIGS. 2A-2H. As another example, the weights assigned to transformation values for pairs of corresponding features outside of the field of view decay according to a linear decay based on distance, a Gaussian decay, or exponential decay based on the distance of such pairs of features from the current field of view. Additionally, in one embodiment the method may place a cap on the distance from the field of view in which transformation values are given non-zero weights and beyond the cap distance the weight is zero.

Typically, the weight for the transformation value for a given pair of features may be no more than ¾, no more that ½, or even no more than ¼, when one of the features is outside the field of view in the corresponding image by a distance which is greater than the maximum diameter of the field of view in that image.

The term "distance" may refer to a Euclidean distance, or Manhattan distance, or even Chebyshev distance. The distance of a feature from an area (e.g. a field of view) may refer to the minimum Euclidean distance (or Manhattan distance or Chebyshev distance) between the feature and any point of the area.

In one possible embodiment, the workstation may provide tools for receiving input from a user for use in computing the weight given to areas outside of the field of view, such as drop-down menu of different weighting schemes, user-selectable caps, or selection of a decay function, or selection of the center of the FOV or the edge of the FOV to start the decay function.

In another aspect, a method for aligning and displaying two different magnified images of the same subject on a viewer (e.g., computer display) is disclosed. The method includes the steps of:

1) identifying pairs of corresponding features in the two different magnified images, and assigning transformation values to each of the pairs of corresponding features, the transformation values representing respective rigid transformations; this step can be computed in advance of the display of the images;

2) determining the current field of view in the viewer;

3) computing weights for a plurality of the transformation values, the weights depending upon the position of the respective pair of corresponding features in relation to the field of view, and the weights including non-zero weights for transformation values for pairs of corresponding features inside and outside of the current field of view;

4) computing a further rigid transformation for areas within the current field of view based on the weights computed in step 3) and the transformation values assigned in step 1);

5) requesting a transformed, aligned image for the current field of view based on the further rigid transformation computed in step 4); and 6) displaying the transformed, aligned image in the viewer.

In still another aspect, a system is described which includes a pathology workstation having a display for representing N different magnified digital images of a tissue specimen to a user, where N is an integer greater than or equal to two, a memory storing parameters of precomputed rigid transformations (linear and rotational) for the N different images globally, wherein sets of corresponding features in the N different magnified digital images are identified and transformation values are assigned to each of the sets of corresponding features; and a processing unit adaptively and repeatedly computing a locally optimal rigid transformation for the current field of view of the tissue specimen viewed by the user on the display. The processing unit gives non-zero weights to transformation values for sets of features that are outside the current field of view when adaptively computing the locally optimal rigid transformation. As the user navigates around the specimen images or changes zoom a new locally optimal rigid transformation is computed and the field of view of the N images are brought into alignment as per the updated locally optimal rigid transformation. The alignment could be in the form of a side by side format or as an overlay. In many situations there are a pair of images that are brought in alignment, and N=2 but in some circumstances, N could be 3, 4 or even greater, for example where a suite of stained images are available of a tissue sample, each member of the suite being stained with a different staining chemical or set of staining chemicals.

A further specific expression of the invention is a system comprising:

a pathology workstation having a display for representing two different magnified digital images of a tissue specimen to a user, a memory storing identified pairs of corresponding features in the two different magnified digital images, and transformation values assigned to each of the pairs of corresponding features, the transformation values representing respective rigid transformations; and a processing unit for repeatedly computing a further rigid transformation for the current field of view of the tissue specimen viewed by the user on the display;

wherein the processing unit is configured to give weights to the transformation values for a plurality of pairs of corresponding features, the weights depending upon the position of the respective pair of corresponding features in relation to the current field of view, including giving non-zero weights to the transformation values for one or more pairs of features that are outside the current field of view, and the processing unit is configured to compute a further rigid transformation by weighting the transformation values for the plurality of pairs of corresponding features by the respective weights; and wherein the further rigid transformation is computed repeatedly as the changes in the zoom/magnification or panning around the images occurs.

DETAILED DESCRIPTION

Without loss of generality, we describe the alignment of two images below, it being understood that the same procedures described below will be applicable when aligning N images where N is an integer greater than or equal to two.

Aligning two images A and B is commonly done by identifying salient features common to both images (e.g. using SIFT, scale-invariant feature transform), associating pairs of features from A and B, and then finding a transformation to map image B onto image A (or A onto B, or both onto a virtual middle ground, without loss of generality).

The image mapping consists of different transformation operations, including all or a subset of: 1) translation, 2) rotation, 3) scale, 4) shear, 5) perspective and 6) warping. Transformations including only (1)-(2) are called rigid transformations, including only (1)-(4) are called affine transformations, whereas transformations including potentially all of these operations result in local deformations of the image.

Rigid transformations have the important property that they preserve the distance between any pair of points in the image—but they can only reflect a global optimum alignment. One way to visualize the mathematical concept behind image alignment is a set of springs that ties each feature point in A to its corresponding feature point in B. A perfect rigid transformation corresponds to the situation that all springs can be at minimum energy at the global optimum and that no local minima exist.

The property of rigid transformation that they preserve the distance between any pair of points is critical for some applications—for instance microscopy tissue images for cancer diagnosis. Corresponding pairs of tissue images are very commonly used in cancer diagnosis, e.g. where one image is an H&E morphological stain and another image is a special stain that highlights specific features. This pair of images often needs to be aligned to show the corresponding image regions side by side or on top of each other. For this application, any non-rigid transformations would lead to distortions and deformations of cellular or morphological features, and could render an image unusable for diagnosis. For example, distorting cancerous cells might make them appear as benign cells, since the cell shape is an important indicator for tumor. However, perfect alignment of two corresponding images using exclusively rigid transformations can only be achieved if both images are not distorted with respect to each other.

The problem arises in that pathology tissue images are virtually never completely deformation-free. Serial sections have slightly different morphology, even if they are taken from adjacent sections of a tissue block cut with a microtome and only 4-5 µm apart. And even a restain of one tissue sample usually exhibits some deformations relative to the tissue prior to restaining, which results from handling the delicate tissue sample in the restaining process. A very common situation is that some parts of the tissue image are stretched or compressed, and often non-homogeneously across the entire tissue. Therefore, there is a conflict here between (1) being limited to rigid transformations while viewing a pair of corresponding images vs. (2) achieving high alignment quality even at cellular detail. In particular, local deformations, which could result in optimal perfect cellular alignment, cannot be used because they would distort the features. This problem is further complicated by the fact that pathology images are of extremely large dimensions (typically 100,000×100,000 pixels), so that there exists potentially a very large number of local minima in the alignment energy surface.

Our solution described here is to find a locally optimal rigid transformation alignment for the image region that is currently displayed on a display, i.e., reviewed by a pathologist on a workstation. For ease of further explanation we continue to illustrate the alignment mathematics as using springs that connect the corresponding feature points in images A and B. Without loss of generality, we try to align image B onto image A. (In the discussion of FIG. 7 below we align source image S onto target image T.) The parameters for the rigid transformation (specifically, a translation and rotation) are computed based on the springs.

In accordance with our method the generation of the aligned image pair presented on a display takes only the springs (transformation values) into account that are in the current field of view, and closely around the perimeter (that is, meeting a proximity criterion in respect of the field of view). Transformation values for areas outside the field of view are given some non-zero weight but, in some embodiments, there is a cap to the distance on which such springs are weighted with non-zero weights and beyond this cap the springs are given zero weight. This will ensure that the region that is currently viewed has the optimal alignment, while regions that are not currently viewed might be ill aligned but that does not matter since such regions are not currently being viewed. When the user zooms or pans to a different field of view, the locally optimal rigid transformation for the alignment is recomputed based on the updated set of springs to be considered and their (newly calculated) associated weights.

Our solution leverages the facts that (1) pathology gigapixel images are commonly viewed only in parts, i.e. the user zooms and pans to a certain field of view, and (2) the deformations in pathology tissue are usually locally smooth. One particular advantageous feature of this solution is that the local alignment errors in the field of view scale with the zooming factor-when the user is zoomed in into a small region, the local alignment needs to be very precise but the alignment outside that field of view does not matter. In contrast, when the user is zoomed out and viewing larger regions, small local alignment details matter less than the larger scale alignment. Exactly this behavior is achieved by our inventive method, with few springs (zoomed in) versus many springs (zoomed out) contributing to compute the alignment.

Taking springs outside the field of view into account for computing the locally optimal rigid transformation is important to ensure a certain amount of smoothness when the field of view is changed, since any abrupt jumps in the alignment would adversely affect the user experience. On the other hand, springs farther away from the field of view should receive less weight in order to achieve a local optimum. Specifically, the extreme case of constant weights for the springs across the entire image would yield only the global optimum, and the other extreme case of a step function where the weight is non-zero inside the field of view and zero outside of it would lead to discontinuities in the alignment when the user pans or zooms and springs enter or leave the field of view. We find a middle ground between these extremes, by taking into account and giving weight to springs that are close to the current field of view, but not giving any weight to springs that are beyond some limit or cap on the distance from the field of view or by reducing such weights to negligible values for example using an exponential decay function based on distance.

There are several possible implementations of the adaptive computing step and in particular the assignment of weights to rigid transformation values. In one embodiment, we assign a constant weight of 1.0 for all areas in the entire field of view or a weight a 1.0 at the center of the field of view, and provide for a decay function on the weight outside of the field of view, e.g., 1) an exponential decay starting from the edge of the field of view, or from the center of the field of view; 2) Gaussian decay away from the edge of the field of view, or from the center of the field of view; or 3) linear decay from the edge of the field of view. In some embodiments we provide for a capping of the decay function, that is, set weight to 0 outside of a maximum distance (or equivalently, number of pixels or percentage of the field of view) away from the field of view or from the center of the field of view.

Figure 1:
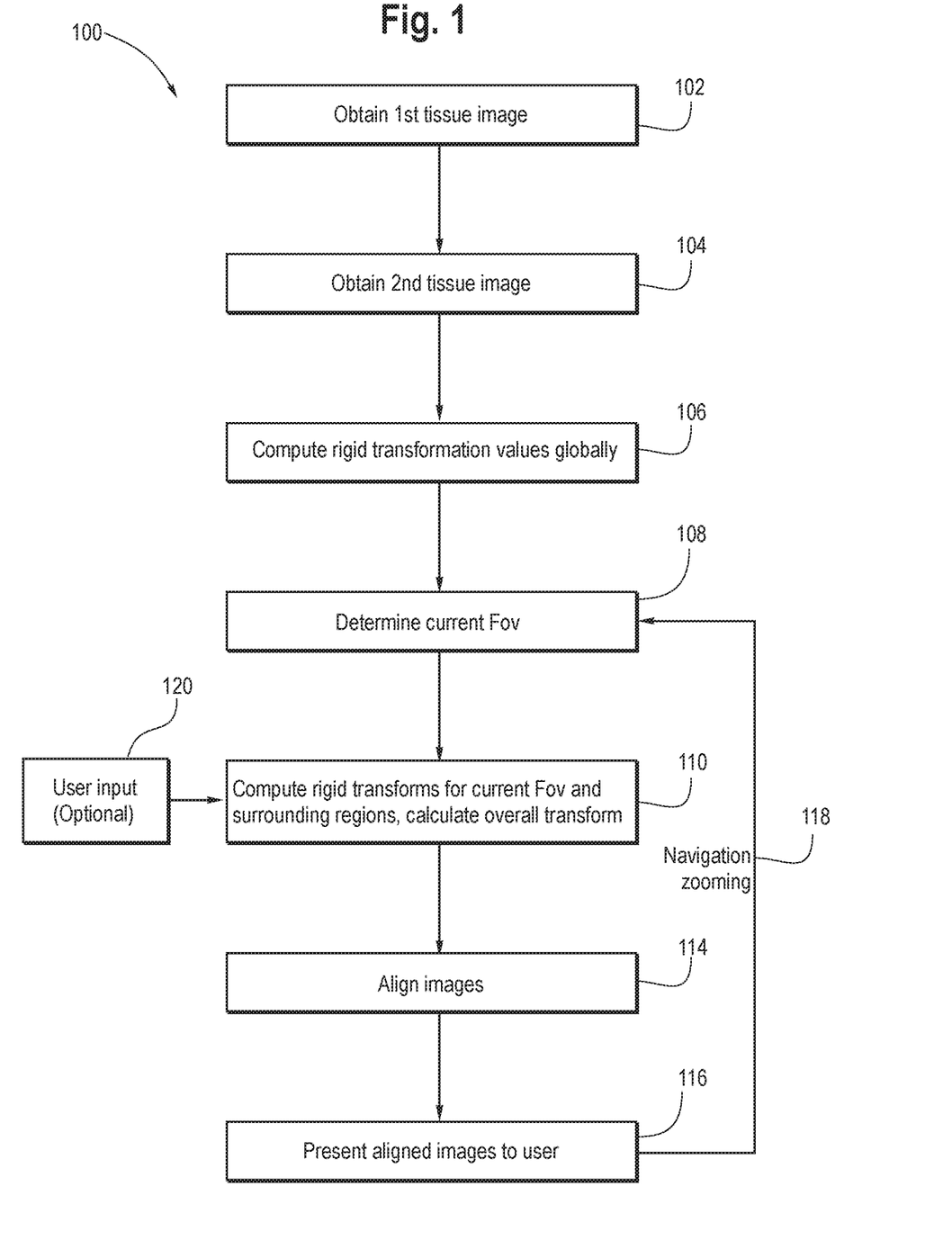
FIG. 1 is a flow chart showing a process for aligning images.

Turning now to the Figures we will now describe several specific embodiments in which the methodology can be practiced. In FIG. 1, a method 100 is shown for aligning and displaying two different magnified images. The present example will be described in conjunction with pathology images, in particular magnified digital images of a tissue specimen obtained from a whole slide scanning of a microscope slide containing the specimen as is known in the art. At step 102, a first tissue image is obtained. This image could be for example a 40×, 20× or 10× magnified digital image of a tissue specimen stained with H&E. At step 104, a second tissue image is obtained. This image could be a 40×, 20× or 10× magnified digital image of the same tissue specimen stained with a special stain, such as an IHC stain. This second image could be obtained from restaining and scanning again the same physical slide used to obtain the first image, or it could be from a serial (adjacent) section of the tissue sample placed on a second microscope slide and stained with the special stain.

At step 106, the rigid transformation values (linear and rotational) for the two different images are precomputed for all feature pairs, i.e., "globally". By "precomputed" we mean ordinarily this step will be performed prior to display of the images on the workstation, as it can be done off-line. In this step, pairs of corresponding features in the two different magnified images are identified, e.g., using scale-invariant feature transform (SIFT) or other procedure, such as for example the methods described in the previously-cited scientific literature. In the context of pathology slides, these features may be for example certain tissue level features, borders or boundaries between types of features, dusters of particular types of cells, etc. The transformation values for the rigid transformations ("coefficients" or "springs") are assigned to each of the pairs of corresponding features, namely the displacement vectors described below and shown in FIGS. 3 and 7. The X/Y pixel locations of each of these features, and the transformation values, are stored in memory, e.g., as metadata associated with the two images.

In one possible embodiment, the computation of the global rigid transformation values can occur when a user at a pathology station having access to the images selects them for viewing. During the brief period of time after the user selects the images and the images are retrieved from memory, the algorithms for computing the rigid transformation values globally are executed and the transformation values are stored in memory of the workstation. Alternatively, they could be calculated earlier in time, such as when the two images are first obtained from a whole slide scanner and paired with each other. Thereafter, the two images are displayed, e.g., side by side, or superimposed on each other. To maintain proper alignment of the images in accordance with the features of this disclosure, steps 108, 110, 114 and 116 are then performed.

At step 108, the current field of view of the tissue images is determined. The display software on the workstation maintains a correspondence or mapping between the pixel coordinates of the images and the display coordinates of the field of view on the display, hence it is possible to map the display coordinates (i.e., boundary of the field of view) to particular X/Y pixel locations of the underlying images. Typically, the field of view that is determined is of one of the two images (image A), and other of the two images (image B) is aligned with image A.

At step 110, we then compute a locally optimal rigid transformation for the image region that is currently reviewed, i.e., the transformation needed to align the FOV of image B to image A. We do this by essentially summing (1) the rigid transformation values for those features for which the global rigid transformations were computed and which are present in the current field of view, with (2) non-zero weighted rigid transformation values for pairs of corresponding features which are present in a limited area surrounding the current field of view. The sum of these transform values is considered the locally optimal rigid transformation, and can be thought of as a net translation+rotation of one image relative to the other, e.g., holding the first (H&E image, image A) image fixed and rotating and translating the second (IHC image, image B) image some amount to result in an alignment of the two images.

Figure 7:
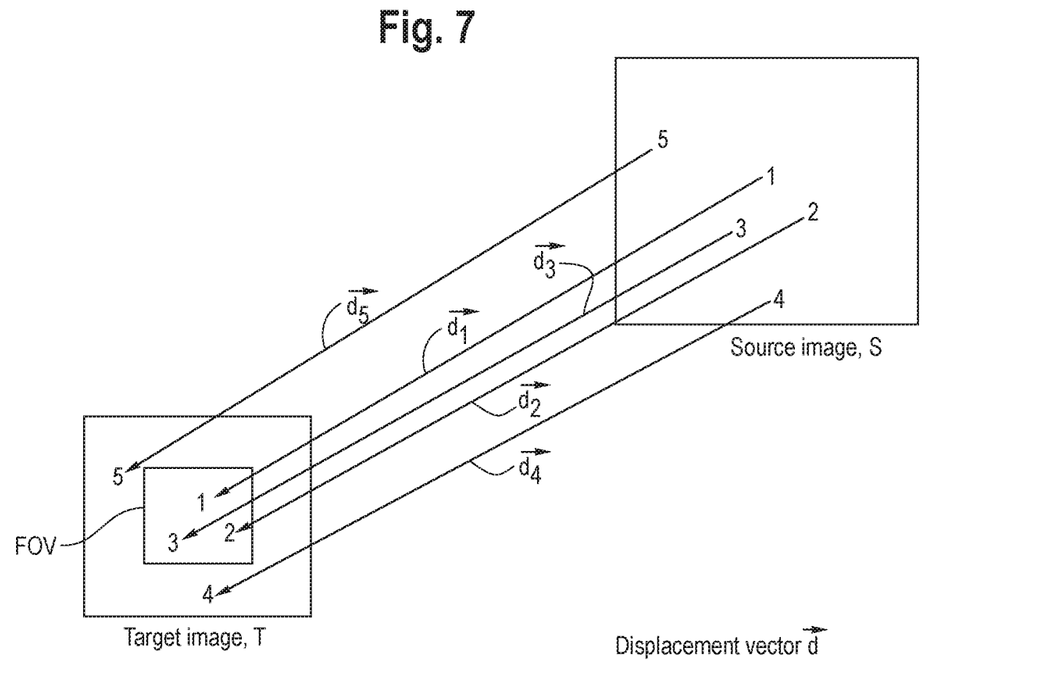
FIG. 7 is an illustration of the displacement vectors d between pairs of corresponding features in a source image S and a target image T, with image S translated to be aligned with image T.

A more formal treatment will now be described in conjunction with FIG. 7. FIG. 7 shows a source image S which is to be aligned onto a target image T. There are 5 pairs of corresponding features numbered 1 through 5 and the vector d represents the displacement of the pairs of features between the two images.

Displacement for feature i=global transformation value= $\vec{d}_i = \vec{x}_i^S - \vec{x}_i^T$ where $\vec{x}_i^S$ is position of feature in S and $\vec{x}_i^T$ is position of feature in T Weighting factor (weight) for feature i $k_i = f(r(\vec{x}_i^T))$ where $r(\vec{x}_i^T)$ is the distance between $\vec{x}_i^T$ and the FOV in the target image, and 0 if inside the FOV in the target image in this particular example.

$$\text{Net force } \vec{D} = \sum_i k_i \vec{d}_i = \sum_i f\left(r(\vec{x}_i^T)\right) \cdot \left(\vec{x}_i^S - \vec{x}_i^T\right) \quad \text{(equation (1))}$$

Equation (1) represents the local optimal rigid transformation.

Box 112 (user input) is an optional step in which user interface controls are provided on the workstation by which the user can adjust the weighting. Examples of the weighting of transformation values outside of the current field of view are described in FIGS. 2A-2H and 3.

At step 114 the field of view of the two images is aligned per the locally optimal transformation computed in step 110.

At step 116, the aligned images are presented to the user, e.g., by displaying them side by side or superimposed on the display of a pathology workstation.

As indicated by loop 118, when the user zooms in or out or navigates to a new position on the images, steps 108, 110, 114 and 116 repeat. The process continues to generate aligned images in which there is a locally optimum rigid transform every time the user navigates to a new location or zooms in or out, until they are finished viewing the images. When the user is done for example viewing the two images which are subject to the process 100 of FIG. 1 and selects two new images, the process 100 is performed again for the new pair of images. In this particular embodiment, the obtaining steps 102 and 104 may simply be performed by selecting previously stored images from a library of pairs of images which reside locally on the workstation or in memory of some other computer or data store, and loading them into the local memory of the workstation.

Depending on the computing resources available on the workstation, the computing steps 106 and 110 could be performed locally or in some other device or system. As one example, when the images are initially obtained from the whole slide scanner, a computer system could perform computations 106 and store the transformation values as metadata associated with the images such that when they are requested by the pathology workstation the transformation values, and pixel addresses, are already present and ready to use when calculating the locally optimal transformation at step 110.

Figure 2A:
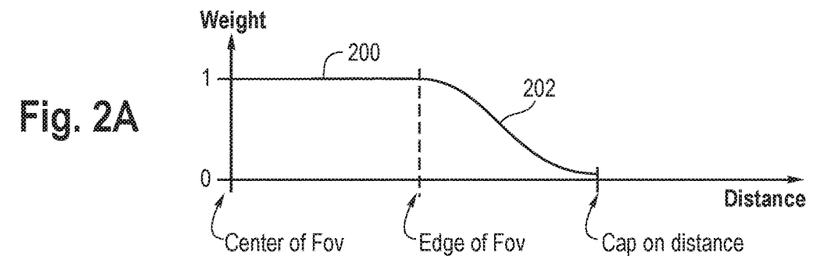
FIGS. 2A-2H are illustrations of several different strategies for assigning weights both the transformation values within the field of view and non-zero weights for transformation values in a limited region outside of the current field of view.

FIGS. 2A-2E are graphs of several examples of how weights can be assigned to the transformation values in and outside of the current field of view during the calculation of the locally optimal transformation value at step 110. In FIG. 2A, there is a plot of weight as a function of distance from the center of the field of view. In this plot the weight is "1" up to the edge of the field of view, indicated by line 200, and then decays according to a Gaussian decay as per line 202 up to location "cap on distance" beyond which the weights are zero. Thus, to calculate the locally optimal transformation, transformation values ("springs") within the field of view are multiplied by a weight of 1, whereas for transformation values in the region between the edge of the field of view but closer than the cap on distance, such values are multiplied by a weighting factor that depends on their distance from the edge of the field of view according to a Gaussian decay function. When all such transformation values multiplied by their weight is summed a net or locally optimal transformation value (rotation and translation) is obtained and the pixels in the second image within the field of view are moved according to such values.

Figure 2B:
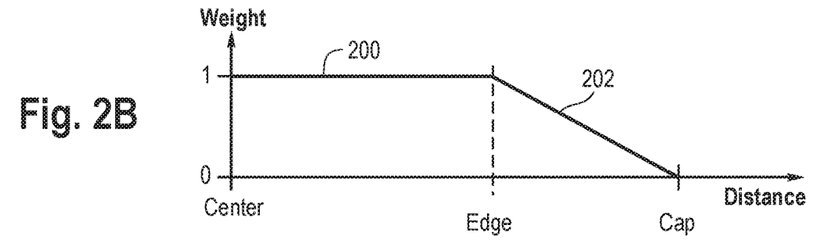

In FIG. 2B, the weight assigned to transformation values within the field of view is "1" as indicated by line 200, whereas there is a linear decay indicated at 202 of weights from the center to the distance indicated by the "cap." The precise values of the linear decay function can be either predetermined as stored parameters or they could be user specified.

Figure 2C:
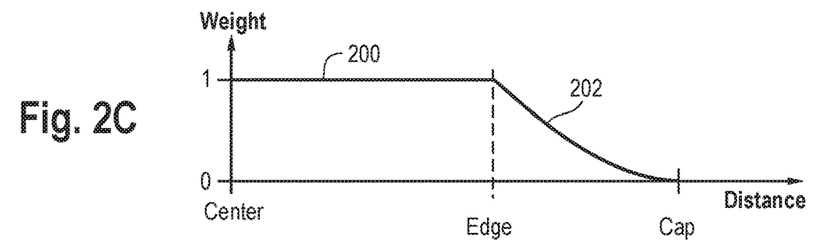

In FIG. 2C, the weight assigned to transformation values within the field of view is "1" as indicated by line 200, whereas there is an exponential decay indicated at 202 of weights from the center to the distance indicated by the "cap". The precise values of the exponential function can be either predetermined as stored parameters or they could be user specified.

Figure 2D:
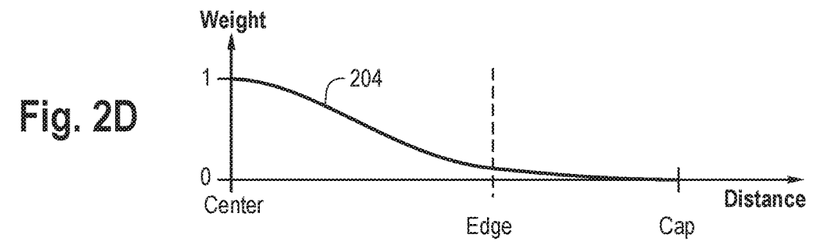

In FIG. 2D, the weight assigned to transformation values within the field of view and outside of the field of view is according to a Gaussian decay function with a value of "1" associated to the center point of the field of view, as indicated at 204. In one variation, the weight assigned to transformation values outside of the field of view up to the cap distance could be assigned a constant value, such as ½, or could be subject to some other decay function.

Figure 2E:
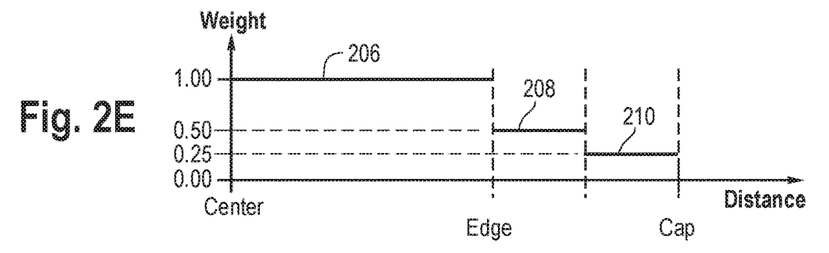

In FIG. 2E, the weight assigned to transformation values within the field of view is set to "1", indicated by line 206, and for the region between the edge of the field of view and a first perimeter (that is, the set of points meeting a first proximity criterion with respect to the field of view) the transformation value weight is a constant, e.g. ½, see line 208, and for the region between the first perimeter and the "cap" distance (that is, the set of points not meeting the first proximity criterion, but meeting a second proximity criterion with respect to the field of view) the transformation value weight is a lesser constant, such as ¼.

Figure 2F:
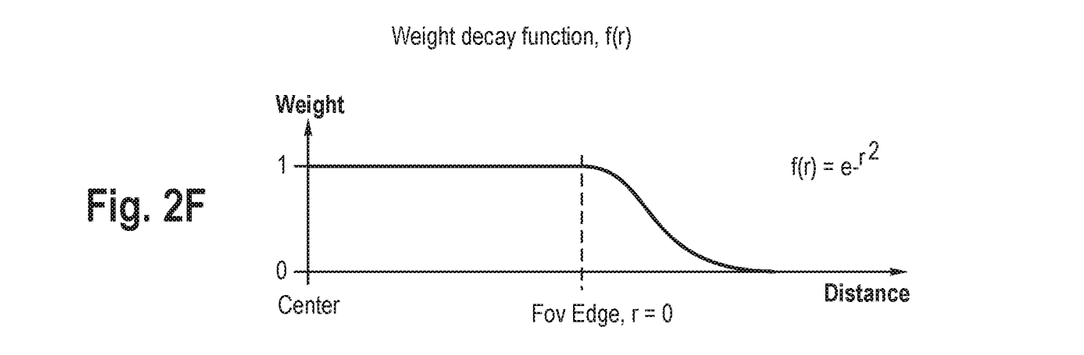
Figure 2G:
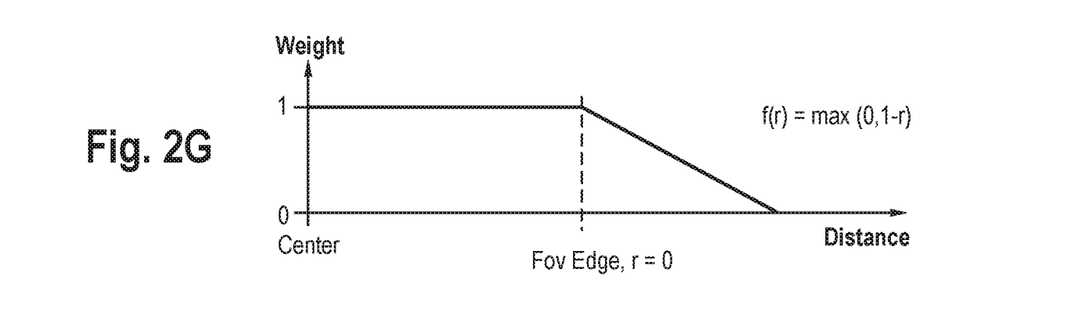
Figure 2H:
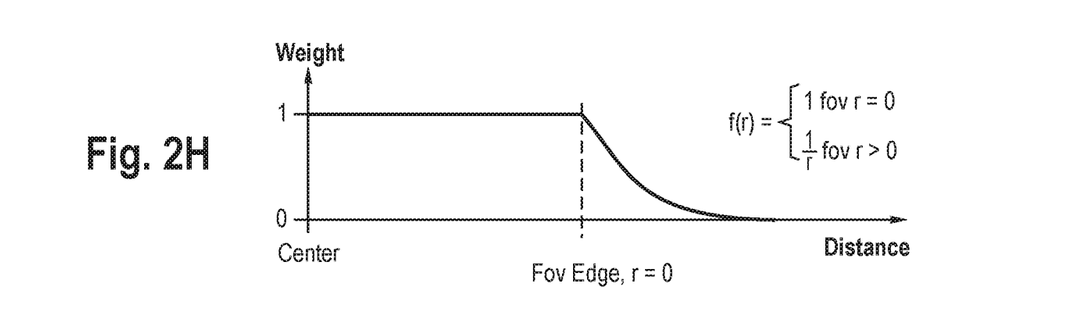

FIGS. 2F-2H show still further examples of weighting decay function f(r), where f(r)=1 within the field of view and decays according to a distance away from the edge of the field of view. In FIG. 2F the decay outside the field of view is according to e raised to the negative r squared power. In FIG. 2G, the decay is according to the function max (0, 1−r). In FIG. 2H, the weight outside the field of view decays according 1/r.

From the foregoing description, persons skilled in the art may arrive at other possible manners of weighting the transformation values outside of the field of view and combining them with the weights for transformation values within the field of view.

Figure 3:
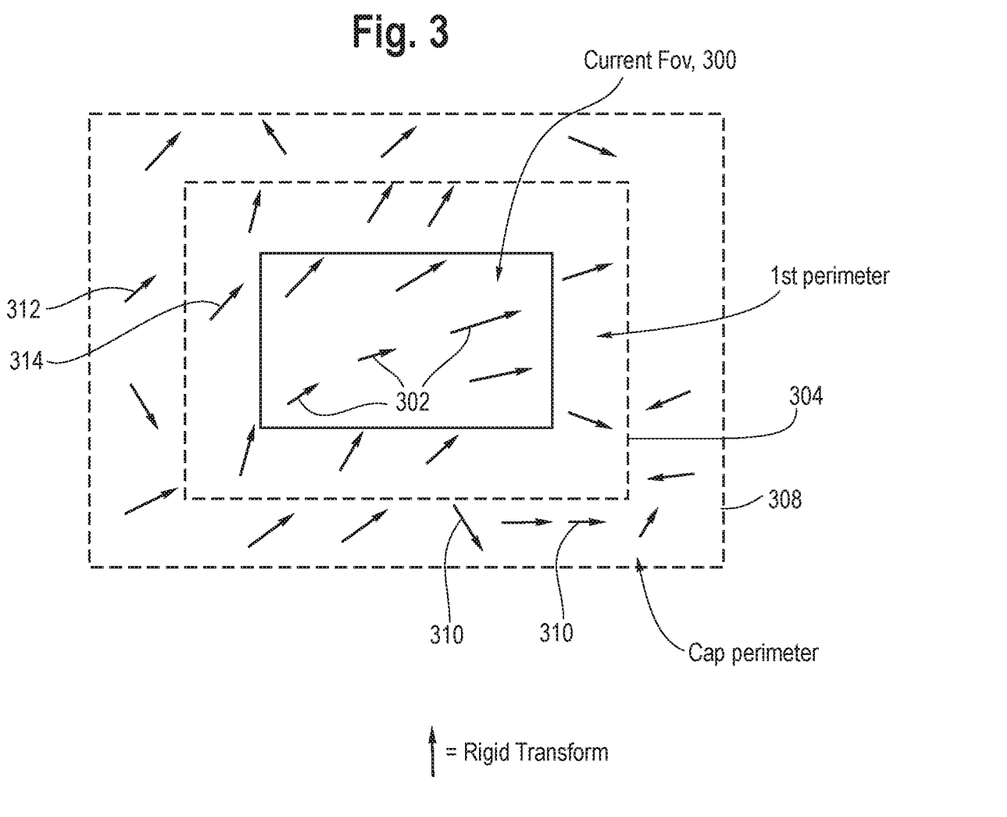
FIG. 3 is an illustration of the transformation values for a field of view of two images and areas surrounding the field of view. The present disclosure describes methods for assigning weights to the transformation values both inside and outside of the field of view in order to arrive at a locally optimal rigid transformation to align the two images.

FIG. 3 shows a graphical example of a particular field of view 300 with arrows 302 showing the magnitude and direction of the rigid transformations for corresponding pairs of features within the field of view where such values were calculated at step 106 in FIG. 1. FIG. 3 also shows a first perimeter 304 and the arrows 306, 314 show the magnitude and direction of the transform values for points in that region. FIG. 3 also shows the cap distance or perimeter 308 and the arrows 310, 312 which indicate the magnitude and direction (vector) of the transformation values in that region. By weighting the values (indicated by the arrows) most heavily in the field of view but also taking into account the values (arrows) outside of the field of view but with less weighting, we are able to adaptively calculate the locally optimum transformation values to align the two images as per FIGS. 1 and 2A-2H. While in FIG. 3 the arrows are shown as straight lines (indicating translation in X and Y directions) in practice the arrows (springs, or transformation values) may have rotational components which are not shown in the arrows of FIG. 3.

Figure 4:
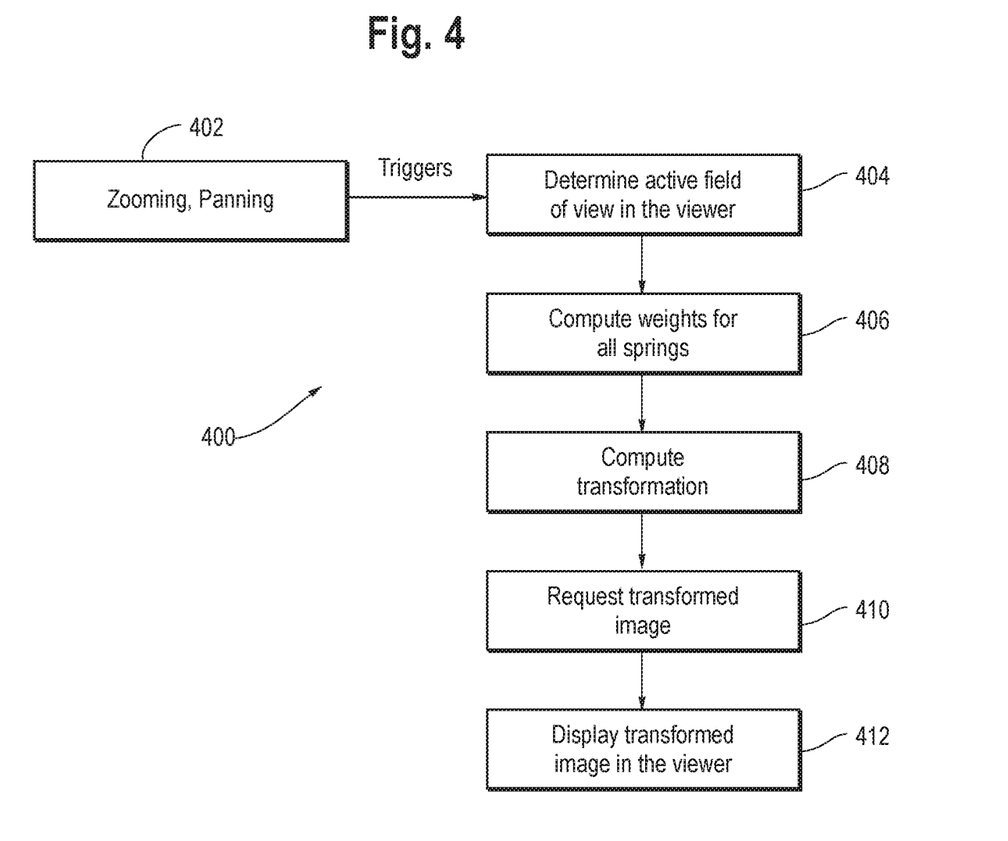
FIG. 4 is a work flow diagram of a viewing application implementing the process of FIG. 1.

FIG. 4 is a workflow diagram 400 of a viewer or display application which may be resident or executed in a workstation used for displaying the aligned images. At step 402, the application receives data indicating user input to execute a pan or zoom operation by use of a mouse or other user interface controls on the workstation is occurring. This data triggers step 404, determine the current field of view in the viewer, e.g., by a mapping of the display pixels in the viewer with pixel addresses of the underlying images. At step 406, the application computes the weights for all the transformation values both inside and outside of the field of view as per one of the definitions which are shown graphically in FIGS. 2A-2E. At step 408, the overall locally optimal transformation is computed as per step 110 of FIG. 1 and as described above and in equation (1). At step 410 a request is made for the transformed image. A module (not shown) carries out the transformation computed at step 408 on the pixels in the field of view of the second image and aligns it with the same field of view of the first image. At step 412 the transformed image (B) is then displayed in the viewer, e.g., side by side or superimposed on the first image as per user instructions.

Figure 5:
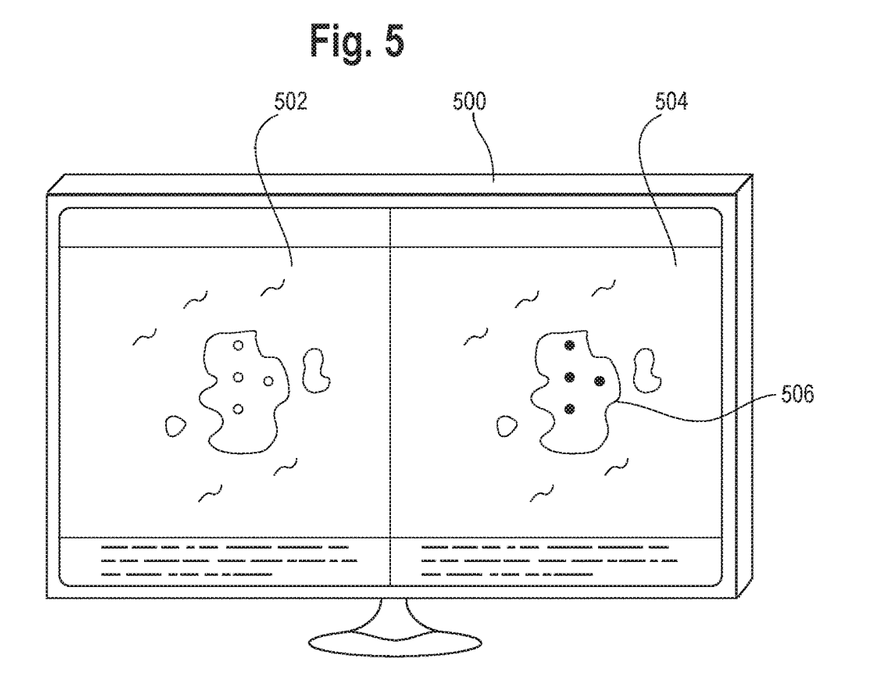
FIGS. 5 and 6 are illustration of a display of a pathology workstation showing the display of aligned pairs of images.
Figure 6:
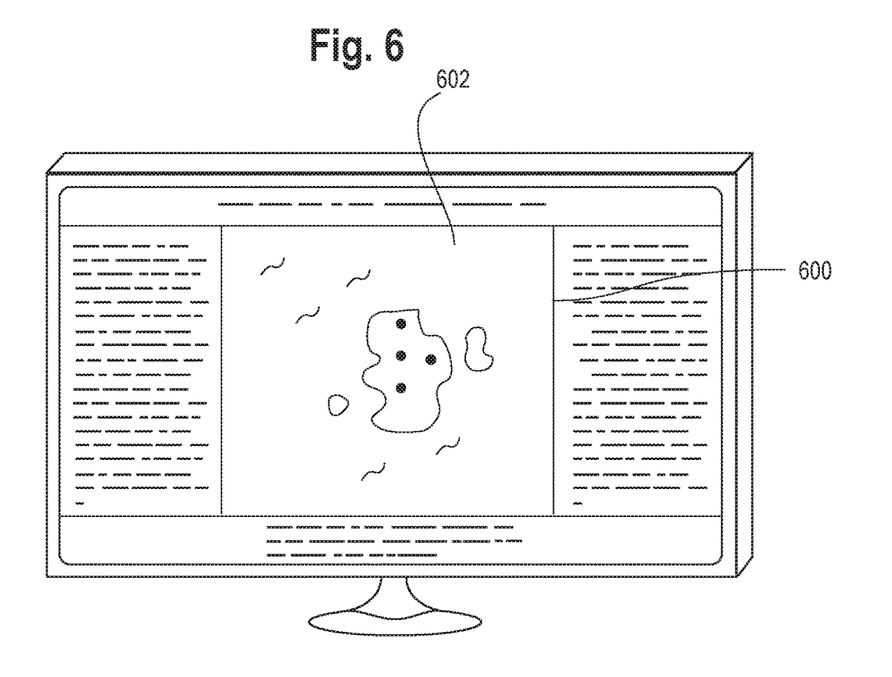

FIG. 5 shows a workstation 500 having a display showing the side-by-side display of two images, the image 502 being a magnified tissue image (e.g., of breast, lung or prostate tissue) stained with H&E and image 504 being a magnified image of the same region in a second image, e.g., the tissue stained with an IHC stain. Note that in the image 504 certain cellular features, such as nuclei or clusters of cells 506 are shown with more contrast, as is typical with IHC stains. In FIG. 6, the user has superimposed the two images as a composite image 600, with the cellular features 602 in alignment with identical features of the H&E image. If the user navigates to a different region of the images, e.g., by moving their mouse over the image 600, new regions of the tissue specimen could be shown as per FIG. 5 or superimposed as per FIG. 6. By virtue of this disclosure the transformation coefficients outside the field of view are taken into account for computing the locally optimal rigid transformation which ensures smoothness when the field of view is changed, without abrupt jumps in the alignment. While FIGS. 5 and 6 show a pair of images brought in side-by-side and overlay alignment, respectively, the principles of this disclosure would extend to alignment of 3 or more images.

From the foregoing, it will be appreciated that we have disclosed a method for aligning and displaying two different magnified images of the same subject, comprising the steps of:

1) computing rigid transformations (linear and rotational) for the two different images globally (FIG. 1, step 106), wherein pairs of corresponding features in the two different magnified images are identified and transformation values are assigned to each of the pairs of corresponding features;

2) while the images are displayed, e.g., on a workstation, adaptively computing a locally optimal rigid transformations for the current field of view (FIG. 1 step 110), wherein in the computing step 2) non-zero weight is given to transformation values for pairs of features that are outside the current field of view, for example as shown in FIGS. 2A-2H; and 3) aligning the images in accordance with the locally optimal rigid transformation.

In one embodiment, the method further includes the step of repeating step 2) and step 3) as the images are viewed by the user and the user either changes magnification or pans to a different location in the images, as indicated by the loop 118 of FIG. 1.

In one embodiment, in step 2) the transformation values within the current field of view receive a maximum weight (e.g., a value of "1"), whereas adjacent areas outside the current field of view receive a lesser or medium, non-zero weighting; and still further areas outside the current field of view will receive a still lesser but non-zero weighting, such as shown by each of the decay functions in FIGS. 2A-2H.

In some embodiments, the method includes a step of placing a cap on the weighting as a function of a distance from the current field of view. For examples, areas within the cap receive some non-zero weight (as shown in FIGS. 2A-2E) but areas outside of the cap receive zero weights. The weight assigned to transformation values for pairs of corresponding features outside of the field of view decays according to one of several functions, including a linear decay, a Gaussian decay or an exponential decay based on the distance of such pairs of points from the current field of view. The method may also include a step of receiving input from a user for use in computing the weights, such as definition of a weighting function, as shown at step 112 in FIG. 1 and explained previously.

As indicated above, in one embodiment the two different images can take the form of a first image (image A) of a slide of a tissue section stained with H&E and a second image (image B) of an adjacent tissue section stained with a special stain, e.g., an immunohistochemical (IHC) stain. The method may be used to bring three or more images into alignment, such as an H&E image, and two different special stain images of serial tissue sections, or an image of a tissue specimen stained with H&E and then restrained with two different special stains.

In another embodiment, a method has been described for aligning and displaying two different magnified images of the same subject on a viewer (e.g., computer display), see FIGS. 5 and 6, comprising the steps of:

1) computing rigid transformations (linear and rotational) for the two different images globally (step 106, FIG. 1) wherein pairs of corresponding features in the two different magnified images are identified and transformation values are assigned to each of the pairs of corresponding features;

2) determining a current field of view in the viewer (step 404);

3) computing non-zero weights for all transformation values for pairs of corresponding features inside and outside of the current field of view (step 406);

4) computing a locally optimal rigid transformation for areas within the current field of view based on weights computed in step 3) (step 408) and the precomputed rigid transformations of step (1);

5) requesting a transformed image for the current field of view (step 410); and 6) displaying the transformed image in the viewer (step 412, FIG. 5, FIG. 6).

In still another aspect, a system has been describes which includes a pathology workstation having a display for representing two different magnified digital images of a tissue specimen to a user (FIGS. 5, 6). The system further includes a memory storing parameters of precomputed rigid transformations for the two different images globally (computed per FIG. 1, step 106), wherein pairs of corresponding features in the two different magnified digital images are identified and transformation values are assigned to each of the pairs of corresponding features. This memory could be local to the workstation or physically located elsewhere, e.g. on a network or in a server in the cloud. The system further includes a processing unit, e.g., a CPU of the workstation, adaptively and repeatedly computing in real time a rigid transformation for the current field of view of the tissue specimen viewed by the user on the display (FIG. 1 step 110). The processing unit gives non-zero weight to transformation values for one or more pairs of features that are outside the current field of view when computing the real time rigid transformation, e.g., as per one of the strategies illustrated and described above in conjunction with FIGS. 2A-2H. As the user zooms or pans around the images new locally optimal rigid transformations are computed so that the images can remain in locally optimal alignment.

What is claimed is:

1. A method for aligning a first image and a second image of a subject, comprising the steps of:
  identifying a plurality of pairs of corresponding features in the first image and the second image;
  determining, for each pair of corresponding features of the plurality of pairs of corresponding features, a respective transformation value, wherein each of the transformation values represents a respective rigid transformation;

computing a first rigid transformation for a first field of view by:
  determining, for each pair of corresponding features of the plurality of pairs of corresponding features, a respective first weight, wherein determining a first weight for a given pair of corresponding features of the plurality of pairs of corresponding features comprises determining the first weight for the given pair of corresponding features based on a position of the given pair of corresponding features in relation to the first field of view such that a non-zero first weight is given to at least one pair of corresponding features that is outside the current first field of view, and
  determining the first rigid transformation by determining a combination of the transformation values such that the transformation values are weighted using the first weights of the pairs of corresponding features to which they correspond; and
aligning the first image and the second image in accordance with the first rigid transformation.

2. The method of claim 1, wherein the first and second images are magnified images, and wherein the method further comprises:
computing a second rigid transformation for a second field of view by:
  determining, for each pair of corresponding features of the plurality of pairs of corresponding features, a respective second weight, wherein determining a second weight for a given pair of corresponding features of the plurality of pairs of corresponding features comprises determining the first weight for the given pair of corresponding features based on a position of the given pair of corresponding features in relation to the second field of view such that a non-zero second weight is given to at least one pair of corresponding features that is outside the second field of view, and
  determining the second rigid transformation by determining a combination of the transformation values such that the transformation values are weighted using the second weights of the pairs of corresponding features to which they correspond; and
aligning the first image and the second image in accordance with the second rigid transformation.

3. The method of claim 1, wherein determining a first weight for the given pair of corresponding features of the plurality of pairs of corresponding features comprises determining the first weight for the given pair of corresponding features based on the position of the respective given pair of corresponding features in relation to the first field of view such that a maximum-valued first weight is given to pairs of corresponding features that are within the first field of view.

4. The method of claim 3, further comprising placing a cap on the first weights as a function of a distance from the first field of view such that pairs of corresponding features beyond a cap distance from the first field of view receive zero-valued first weights.

5. The method of claim 1, wherein determining a first weight for the given pair of corresponding features of the plurality of pairs of corresponding features comprises determining the first weight for the given pair of corresponding features based on the position of the respective given pair of corresponding features in relation to the first field of view such that pairs of corresponding features that are outside of the first field of view are given weights that decay according to a linear decay, a Gaussian decay or an exponential decay based on the distance of such pairs of corresponding features from the first field of view.

6. The method of claim 1, wherein the first image is an image of a slide of a tissue section stained with H&E and the second image is an image of an adjacent tissue section stained with an immunohistochemical (IHC) stain.

7. The method of claim 1, wherein the method further comprises receiving input from a user for use in computing the weights.

8. A method for aligning and displaying a first magnified image and a second magnified image of the same subject on a viewer, comprising the steps of:
identifying a plurality of pairs of corresponding features in the first magnified image and the second magnified image;
determining, for each pair of corresponding features of the plurality of pairs of corresponding features, a respective transformation value, wherein each of the transformation values represents a respective rigid transformation;
determining a first field of view in the viewer;
determining for each of the transformation values a respective first weight, wherein determining a first weight for a given transformation value comprises determining the first weight for the given transformation value based on a position, relative to the first field of view, of a pair of corresponding features of the plurality of pairs of corresponding features that is associated with the given transformation value such that non-zero first weights are determined for transformation values associated with pairs of corresponding features inside and outside of the first field of view;
computing a first rigid transformation by determining a combination of the transformation values weighted according to the first weights;
requesting a first transformed image for the first field of view based on the first rigid transformation; and
displaying the first transformed image in the viewer.

9. The method of claim 8, further comprising:
determining a second field of view in the viewer;
determining for each of the transformation values a respective second weight, wherein determining a second weight for a given transformation value comprises determining the second weight for the given transformation value based on a position, relative to the second field of view, of a pair of corresponding features of the plurality of pairs of corresponding features that is associated with the given transformation value such that non-zero second weights are determined for transformation values associated with pairs of corresponding features inside and outside of the second field of view;
computing a second rigid transformation by determining a combination of the transformation values weighted according to the second weights;
requesting a second transformed image for the second field of view based on the rigid transformation; and
displaying the second transformed image in the viewer.

10. The method of claim 8, wherein determining a first weight for the given transformation value features comprises determining the first weight for the given transformation value based on the position, relative to the first field of view, of the pair of corresponding features of the plurality of pairs of corresponding features that is associated with the given transformation value such that a maximum-valued first weight is given to transformation values that corresponding to pairs of corresponding features that are within the first field of view.

11. The method of claim 10, further comprising placing a cap on the first weights as a function of a distance from the first field of view such that transformation values that correspond to pairs of corresponding features beyond a cap distance from the first field of view receive zero valued first weights.

12. The method of claim 8, wherein determining a first weight for the given transformation value features comprises determining the first weight for the given transformation value based on the position, relative to the first field of view, of the pair of corresponding features of the plurality of pairs of corresponding features that is associated with the given transformation value such that transformation values that corresponding to pairs of corresponding features that are outside of the first field of view are given weights that decay according to a linear decay, a Gaussian decay or an exponential decay based on the distance of such pairs of corresponding features from the first field of view.

13. The method of claim 8, wherein the first magnified image is an image of a slide of a tissue section stained with H&E and second magnified image is an image of an adjacent tissue section stained with an immunohistochemical (IHC) stain.

14. The method of claim 8, wherein the method further comprises receiving input from a user for use in computing the weights.

15. A system comprising:
a pathology workstation having a display for representing a first magnified digital image and a second magnified digital image of a tissue specimen to a user,
a memory storing identified pairs of corresponding features in the first and second magnified digital images, and transformation values assigned to each of the pairs of corresponding features, the transformation values representing respective rigid transformations; and
a processing unit for repeatedly updating a rigid transformation for a field of view of the tissue specimen generated on the display in response to changes of the field of view, wherein the changes of the field of view comprise changes in magnification or panning across the first and second magnified digital images;
wherein the processing unit is configured to update the rigid transformation for the field of view by:
determining, for each pair of corresponding features of the plurality of pairs of corresponding features, a respective weight, wherein determining a weight for a given pair of corresponding features comprises determining the weight for the given pair of corresponding features based on a position, relative to the field of view, of the given pair of corresponding features such that non-zero weights are determined for pairs of corresponding features inside and outside of the field of view and
updating the rigid transformation for the field of view by determining a combination of the transformation values such that the transformation values are weighted using the weights of the pairs of corresponding features to which they correspond.

* * * * *